US012375389B2

(12) United States Patent
Vasseur et al.

(10) Patent No.: US 12,375,389 B2
(45) Date of Patent: Jul. 29, 2025

(54) SAFETY NET ENGINE FOR MACHINE LEARNING-BASED NETWORK AUTOMATION

(71) Applicant: Cisco Technology, Inc., San Jose, CA (US)

(72) Inventors: Jean-Philippe Vasseur, Saint Martin d'Uriage (FR); Vinay Kumar Kolar, San Jose, CA (US); Grégory Mermoud, Venthône (CH); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 253 days.

(21) Appl. No.: 17/327,927

(22) Filed: May 24, 2021

(65) Prior Publication Data

US 2022/0377005 A1 Nov. 24, 2022

(51) Int. Cl.
*H04L 45/02* (2022.01)
*G06N 5/04* (2023.01)
*G06N 20/00* (2019.01)
*H04L 41/14* (2022.01)
*H04L 41/147* (2022.01)

(52) U.S. Cl.
CPC .............. *H04L 45/08* (2013.01); *G06N 5/04* (2013.01); *G06N 20/00* (2019.01); *H04L 41/145* (2013.01); *H04L 41/147* (2013.01)

(58) Field of Classification Search
CPC ..... H04L 45/08; H04L 41/145; H04L 41/147; G06N 20/00; G06N 5/04
See application file for complete search history.

(56) References Cited

U.S. PATENT DOCUMENTS

| 8,260,887 | B2 | 9/2012 | Romain et al. |
| 9,836,696 | B2 * | 12/2017 | Vasseur ................. G06N 5/048 |
| 10,454,780 | B2 | 10/2019 | Jeuk et al. |
| 10,904,135 | B2 | 1/2021 | Hegde et al. |
| 11,943,294 | B1 * | 3/2024 | Bartenstein ......... H04L 67/5651 |
| 2017/0364831 | A1 * | 12/2017 | Ghosh ..................... G06F 40/40 |
| 2018/0027006 | A1 * | 1/2018 | Zimmermann ..... G06F 21/6218 726/11 |
| 2018/0359172 | A1 | 12/2018 | Yadav |

(Continued)

FOREIGN PATENT DOCUMENTS

| CN | 113424494 A * | 9/2021 | ........... G06F 3/0482 |
| KR | 20180107789 A1 * | 10/2018 | |

*Primary Examiner* — Derrick W Ferris
*Assistant Examiner* — Jesse P. Samluk
(74) *Attorney, Agent, or Firm* — BEHMKE INNOVATION GROUP LLC; James M. Behmke

(57) ABSTRACT

In one embodiment, a device obtains data regarding routing decisions made by a machine learning-based predictive routing engine for a network. The device determines, based on the data regarding the routing decisions, a behavior of the machine learning-based predictive routing engine. The device compares the behavior of the machine learning-based predictive routing engine to a behavioral policy for the machine learning-based predictive routing engine. The device adjusts operation of the machine learning-based predictive routing engine, when the behavior of the machine learning-based predictive routing engine violates the behavioral policy.

17 Claims, 11 Drawing Sheets

(56) References Cited

U.S. PATENT DOCUMENTS

| | | |
|---|---|---|
| 2020/0136890 A1 | 4/2020 | To et al. |
| 2021/0035021 A1 * | 2/2021 | Sasson et al. |
| 2022/0129785 A1 * | 4/2022 | Vogeti .................... G06N 20/00 |
| 2022/0231923 A1 * | 7/2022 | Di Martino ......... H04L 41/5041 |

* cited by examiner

SAFETY NET ENGINE FOR MACHINE LEARNING-BASED NETWORK AUTOMATION

TECHNICAL FIELD

The present disclosure relates generally to computer networks, and, more particularly, to a safety net engine for machine learning-based network automation.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QOS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. However, the decision to fully automate routing decisions or to keep them manually controlled by a network administrator has largely been a binary decision, with many network administrators remaining leery of ceding control of the network over to a predictive engine without a mechanism to ensure acceptable performance. Moreover, different network administrators may have different expectations with respect to how aggressive the automatic control of the network. Indeed, it may be preferable to take no action than unnecessarily rerouting traffic, as rerouting traffic in a network can still negatively affect the traffic. Conversely, failing to reroute traffic in advance of a failure can result in a potentially critical traffic disruption.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
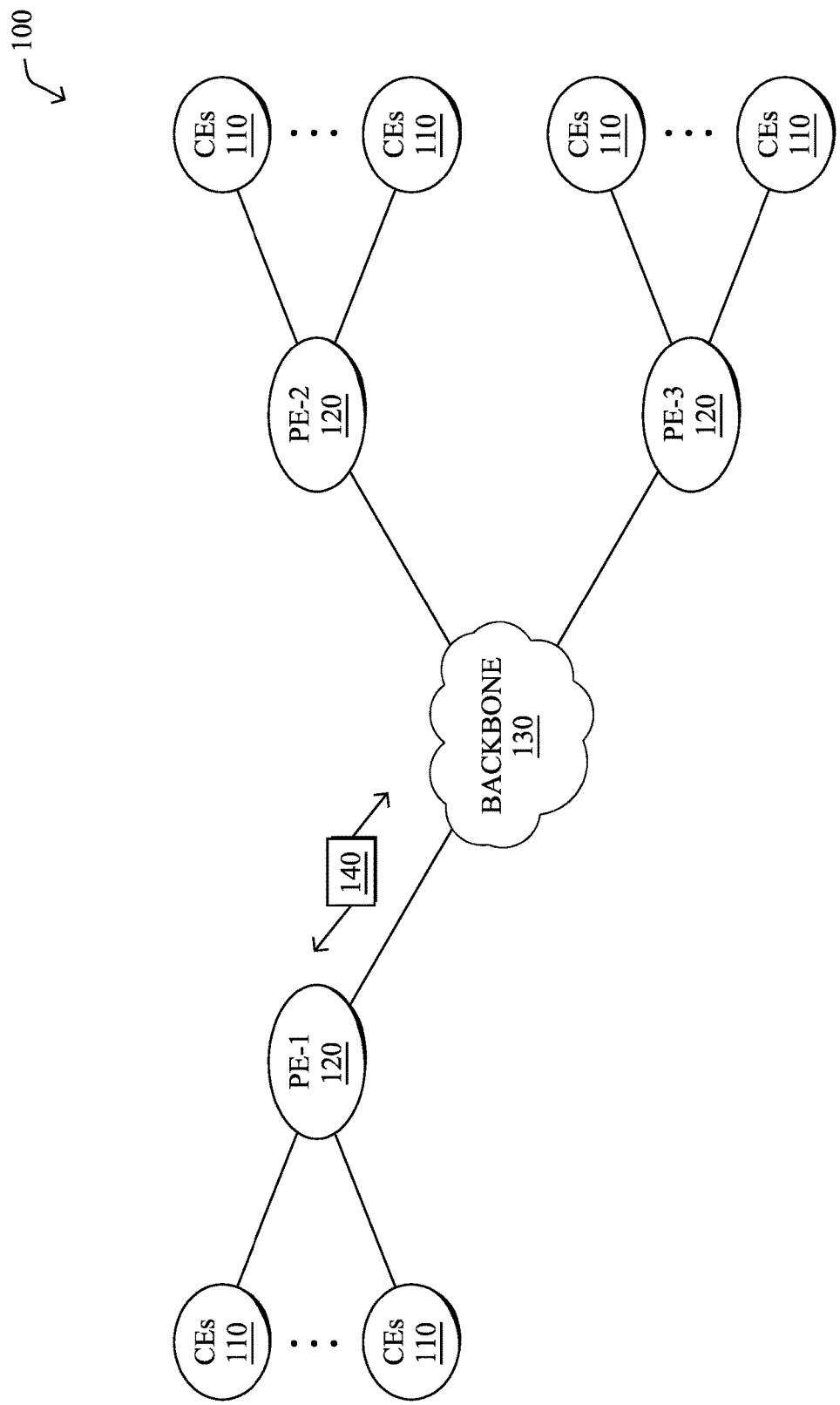
FIGS. 1A-1B illustrate an example communication network.

According to one or more embodiments of the disclosure, a device obtains data regarding routing decisions made by a machine learning-based predictive routing engine for a network. The device determines, based on the data regarding the routing decisions, a behavior of the machine learning-based predictive routing engine. The device compares the behavior of the machine learning-based predictive routing engine to a behavioral policy for the machine learning-based predictive routing engine. The device adjusts operation of the machine learning-based predictive routing engine, when the behavior of the machine learning-based predictive routing engine violates the behavioral policy.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
2.) Site Type B: a site connected to the network by a router via two primary links (e.g., from different Service Providers), with potentially a backup link (e.g., a 3G/4G/5G/LTE connection). A site of type B may itself be of different types:
2a.) Site Type B1: a site connected to the network using two MPLS VPN links (e.g., from different Service Providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
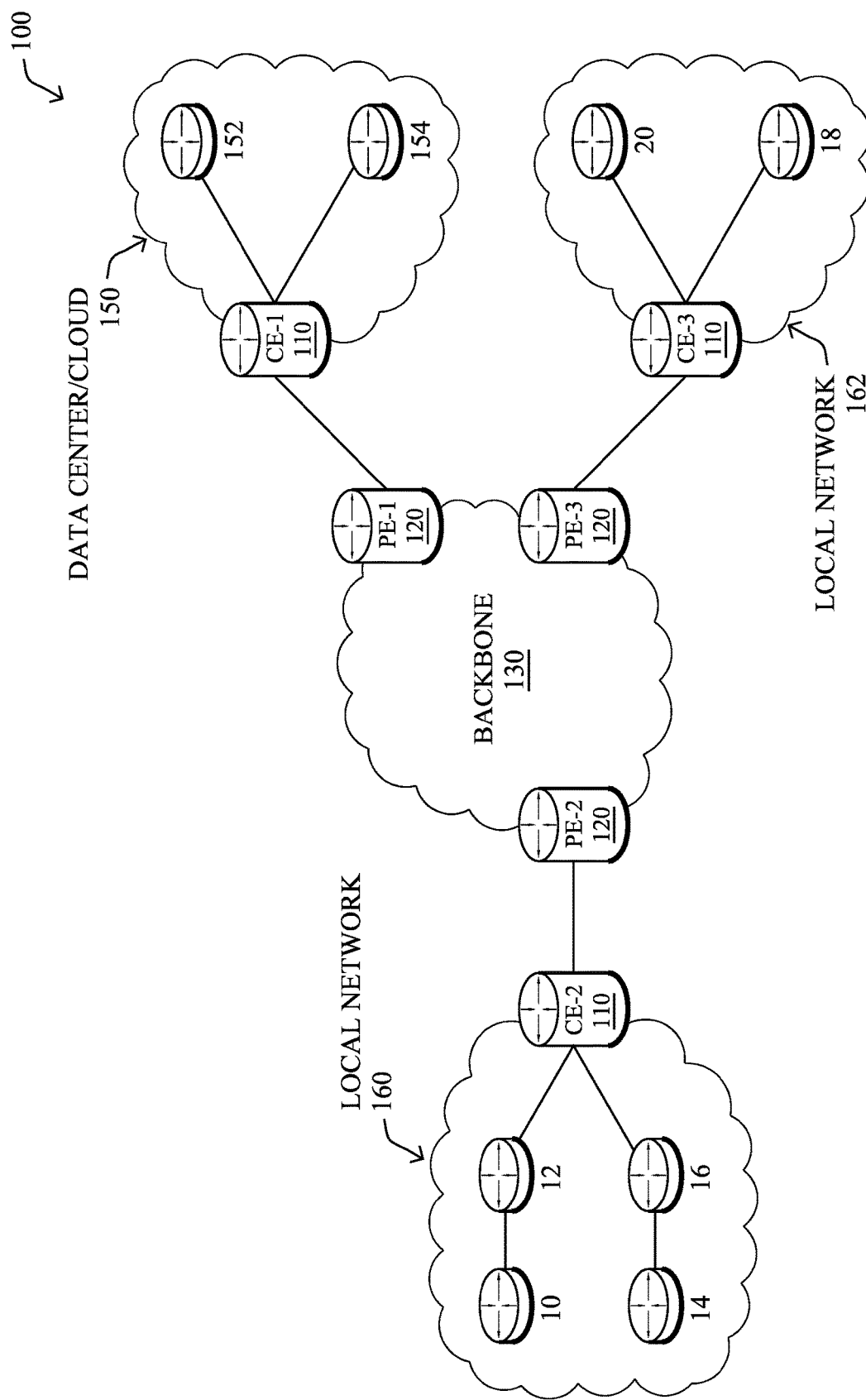

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
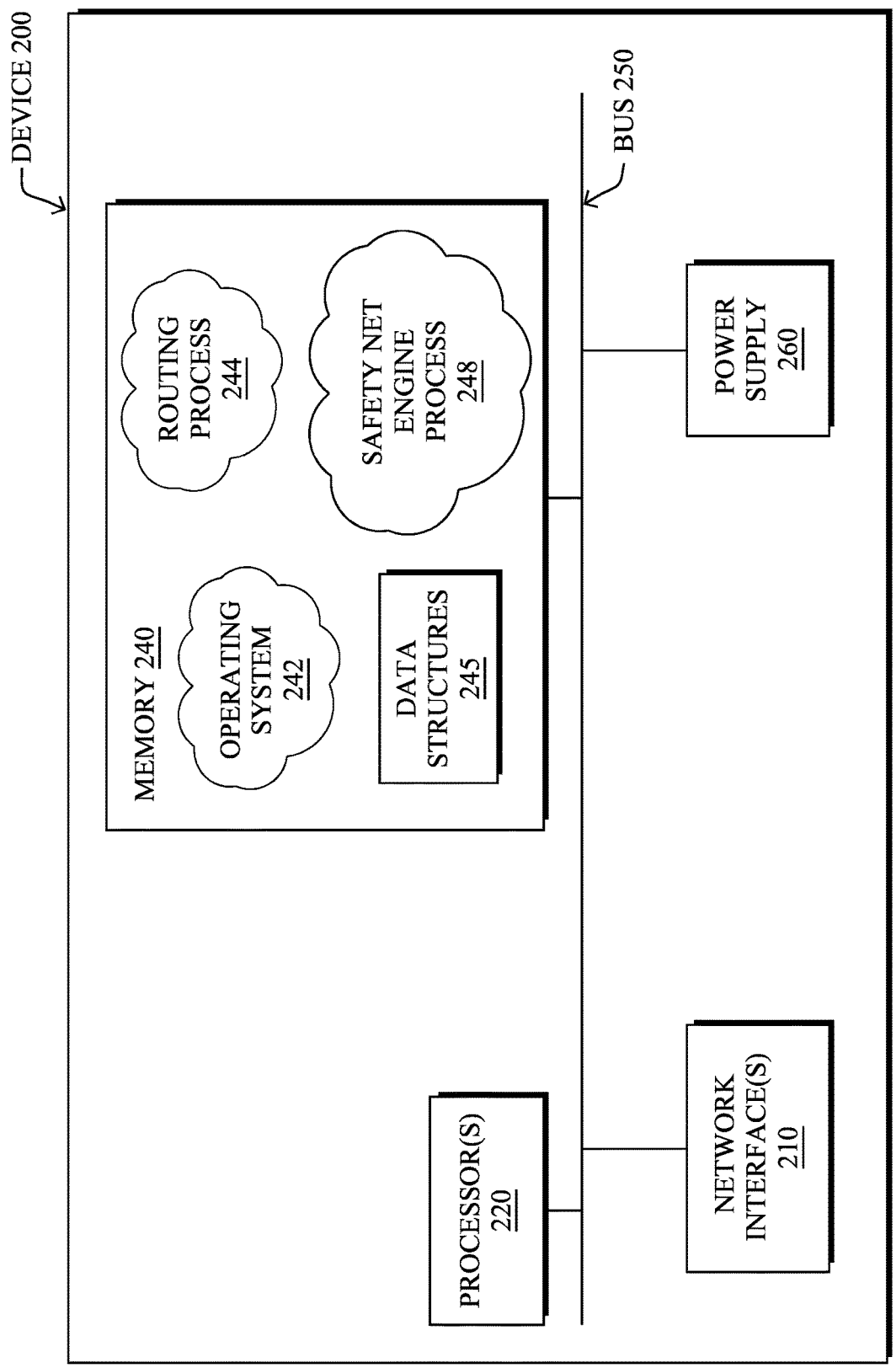
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a safety net engine process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or safety net engine process 248 may also include computer executable instructions that, when executed by processor(s) 220, cause device 200 to perform the techniques described herein. To do so, in some embodiments, routing process 244 and/or safety net engine process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or safety net engine process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or safety net engine process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
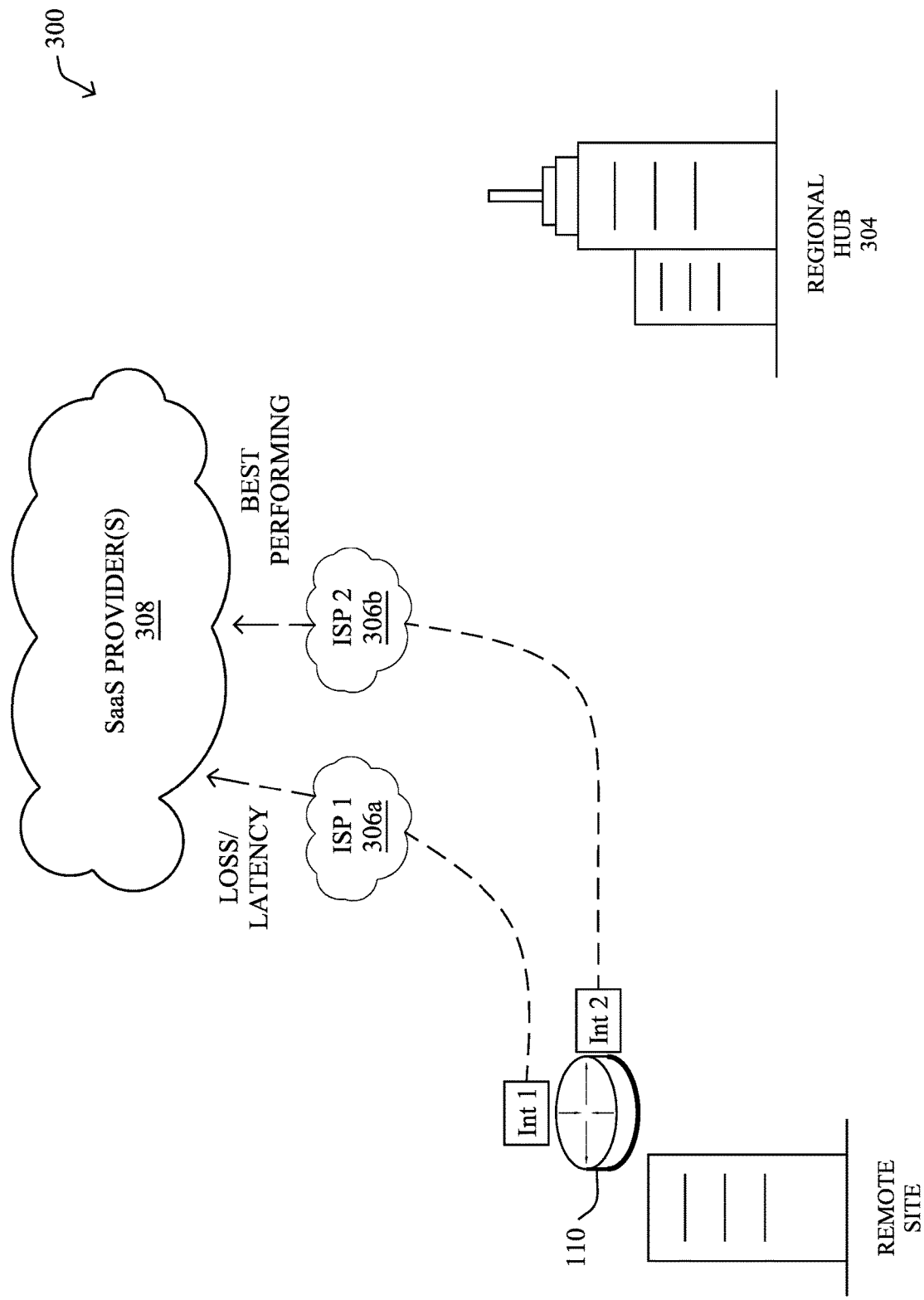
FIGS. 3A-3B illustrate example network deployments.
Figure 3B:
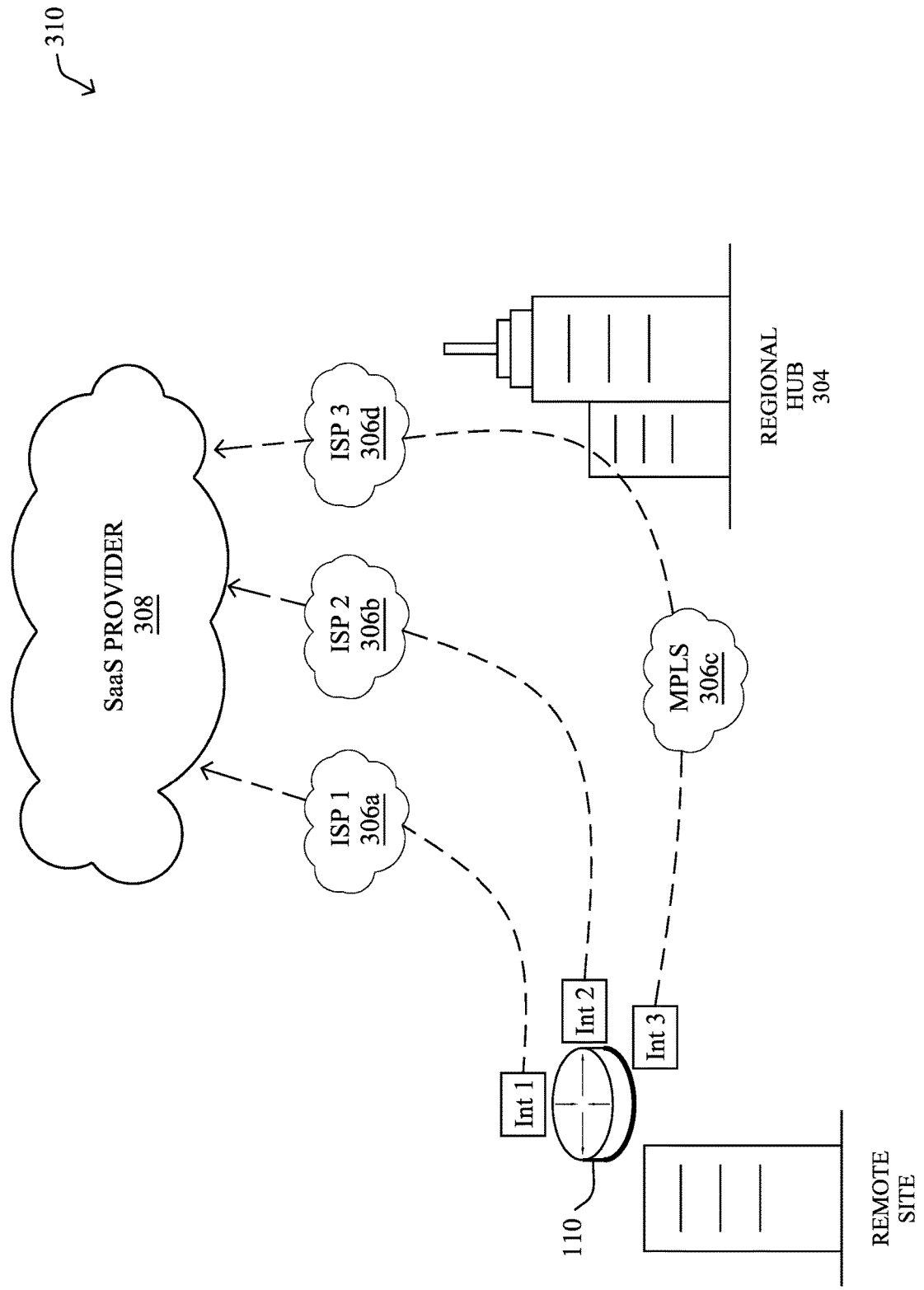

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
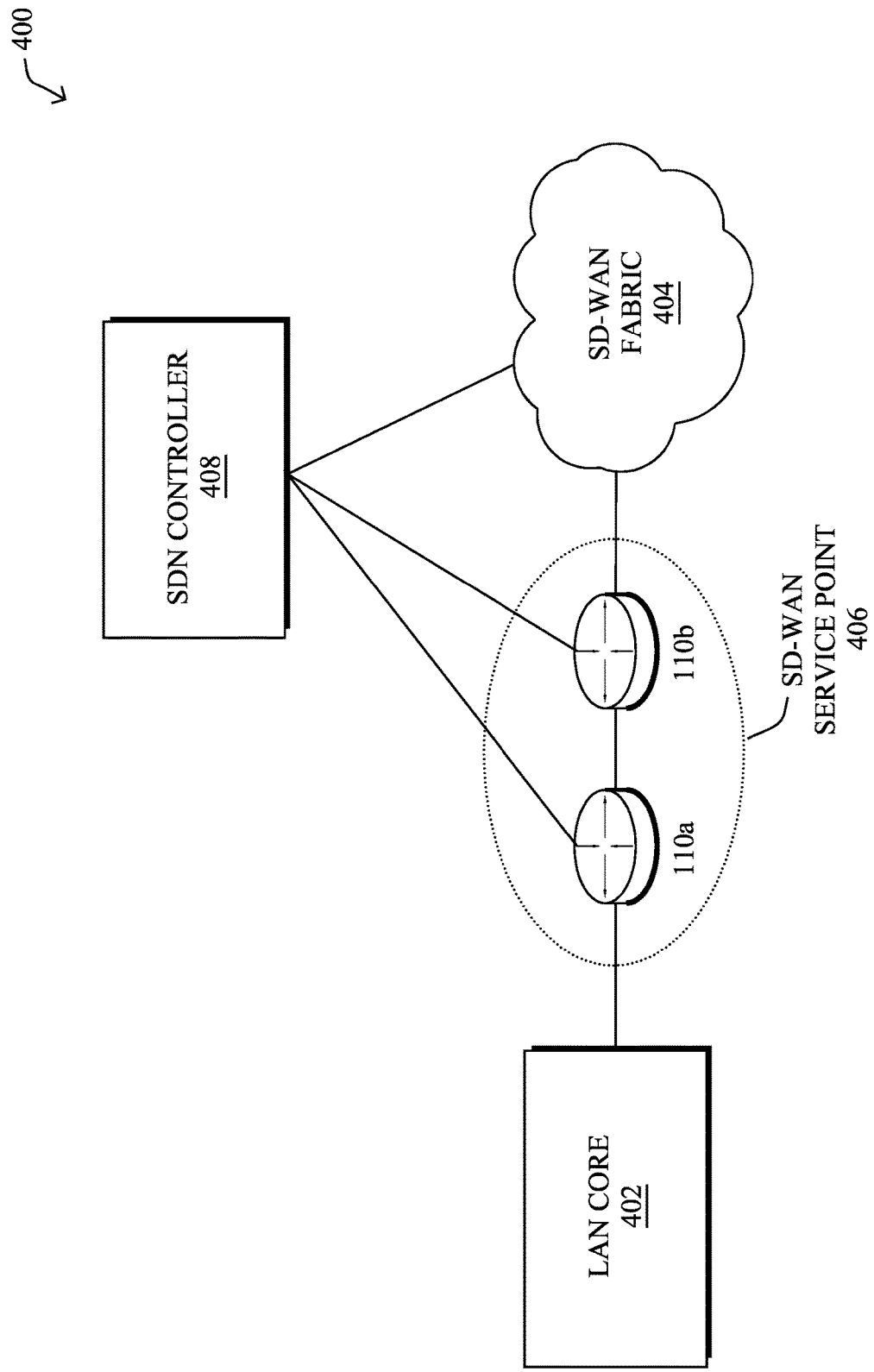
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed "best path," according to the metric.

The term "SLA failure" refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

"The SLA for the application is guessed," using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
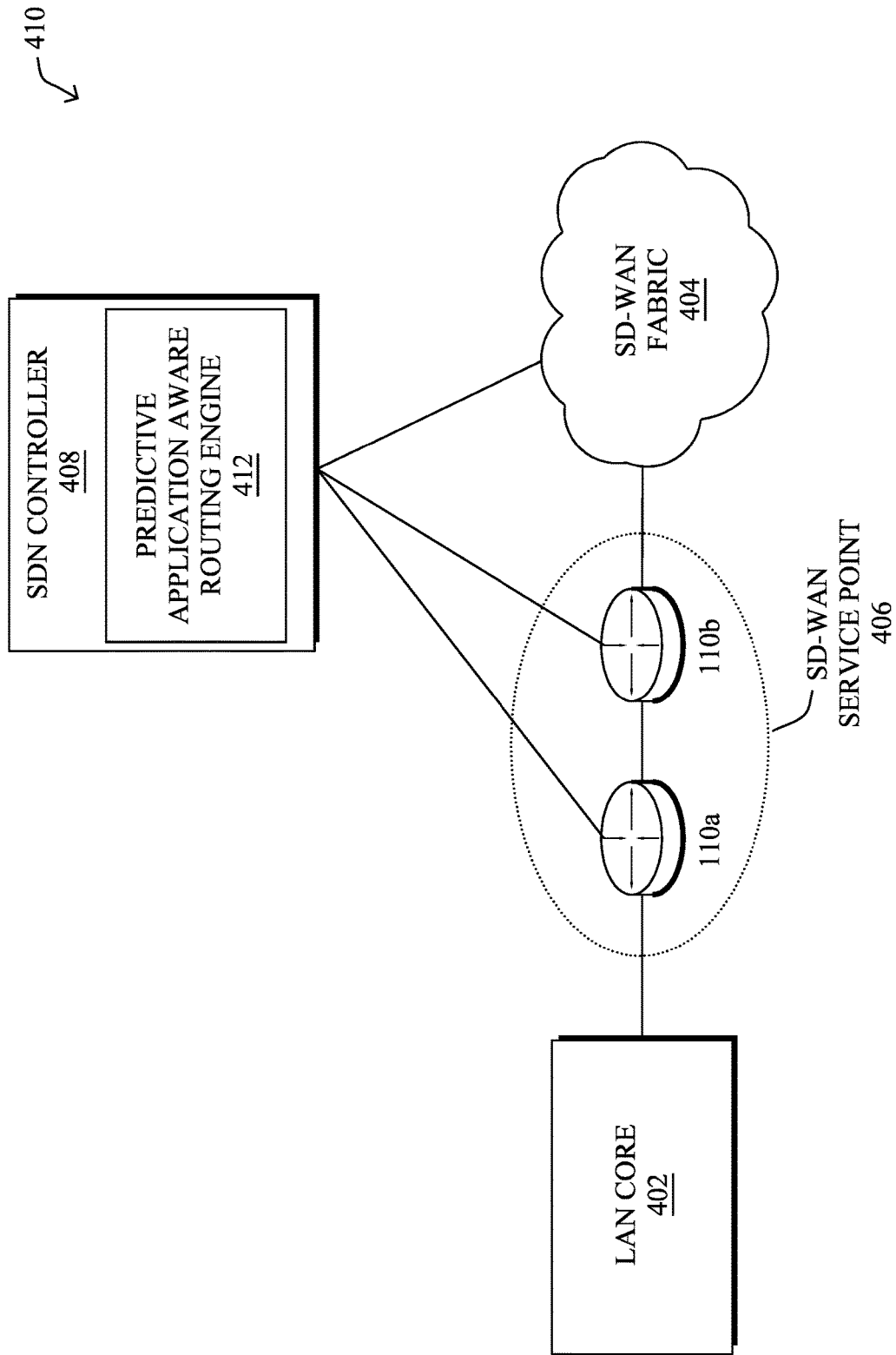

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or safety net engine process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which may be temporary in nature or may be made permanent.

As noted above, a predictive routing engine, such as predictive application aware routing engine 412, is able to leverage machine learning to predict path disruptions and proactively reroute traffic in a network to avoid those disruptions. Typically, the results of the routing decisions are collected and assessed, to improve the accuracy of the prediction model of the routing engine over time. For instance, if the routing engine failed to predict a disruption along a path, telemetry data leading up to the disruption can be leveraged to better predict such a disruption in the future.

Despite great advances in machine learning and the demonstrable efficacy of automated routing systems, many network operators are still hesitant to adopt their use. First, if the predictive routing engine begins to behave inappropriately, either because of some internal effect of the algorithms performing the predictions (e.g., a huge spike in the number of predictions being performed because of the dynamics of the system or the specific dynamics of the network), or the effects of the automation (e.g., routing changes), leading to unexpected and undesired results.

—Safety Net Engine for Machine Learning-Based Network Automation—

The techniques herein introduce a safety net engine that monitors a network automation engine, such as a predictive routing engine. In some aspects, relevant telemetry and performance indicators are obtained, to assess the effect of a given automation action on a network and detect detrimental action (e.g., degradation of QoS, throughput of traffic, etc.). In another aspect, the safety net engine may decide whether the network automation engine must enter a period of active surveillance or must simply be disconnected, in order to protect the network. Such decisions may be governed by policy rules taking into account a user risk level acceptance. In addition, the techniques herein allow for a tradeoff to be made between risk-taking and conservative behaviors of the automation engine, as well as the adjustment of risk profiles. Additionally, the techniques herein may be used to recommend a risk profile to a network operator or other user.

Illustratively, the techniques described herein may be performed by hardware, software, and/or firmware, such as in accordance with safety net engine process 248, which may include computer executable instructions executed by the processor 220 (or independent processor of interfaces 210) to perform functions relating to the techniques described herein (e.g., in conjunction with routing process 244).

Specifically, according to various embodiments, a device obtains data regarding routing decisions made by a machine learning-based predictive routing engine for a network. The device determines, based on the data regarding the routing decisions, a behavior of the machine learning-based predictive routing engine. The device compares the behavior of the machine learning-based predictive routing engine to a behavioral policy for the machine learning-based predictive routing engine. The device adjusts operation of the machine learning-based predictive routing engine, when the behavior of the machine learning-based predictive routing engine violates the behavioral policy.

Figure 5:
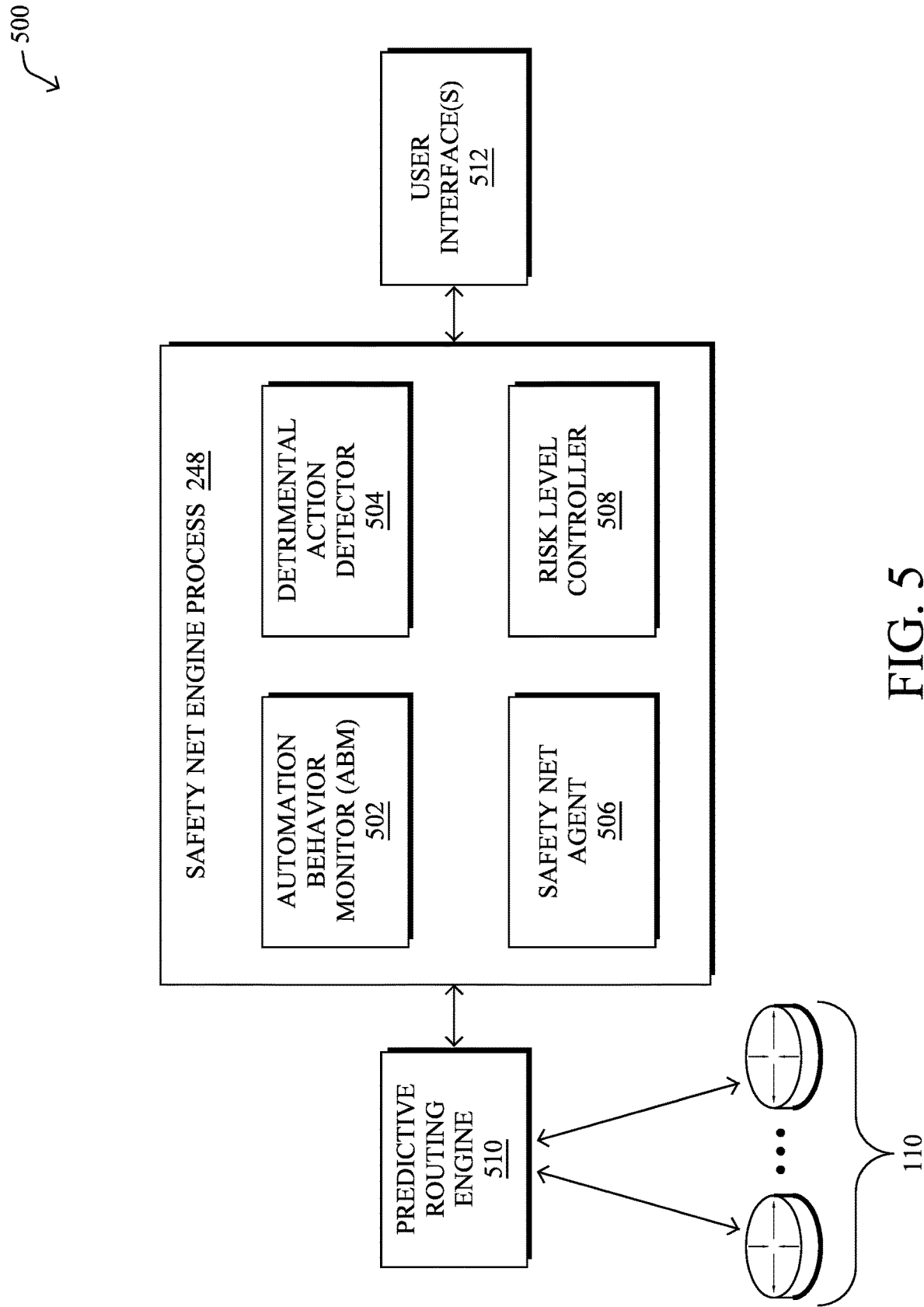
FIG. 5 illustrates an example architecture for a safety net engine.

Operationally, FIG. 5 illustrates an example architecture 500 for a safety net engine, according to various embodiments. At the core of architecture 500 is safety net engine process 248, which may be executed by a controller for a network or another device in communication therewith. For instance, safety net engine process 248 may be executed by a controller for a network (e.g., SDN controller 408 in FIGS. 4A-4B), a particular networking device in the network (e.g., a router, etc.), another device or service in communication therewith, or the like.

As shown, architecture 500 may include any or all of the following components: an automation behavior monitor (ABM) 502, a detrimental action detector 504, a safety net agent 506, and/or a risk level controller 508. As would be appreciated, the functionalities of these components may be combined or omitted, as desired. In addition, these components may be implemented on a singular device or in a distributed manner, in which case the combination of executing devices can be viewed as their own singular device for purposes of executing safety net engine process 248.

In various embodiments, automation behavior monitor (ABM) 502 is in charge of observing the automation pattern of a first system such as predictive routing engine 510, potentially on a per-network basis. For example, ABM 502 may monitor a series of behaviors such as the per-class automation actions for a network (e.g., the number of QoS configuration changes generated for a given site, the number of routing patches for a router 110, etc.). Note that the nature of such actions may also be monitored by ABM 502.

Typically, the duration of routing patches generated by predictive routing engine 510 and pushed to a router 110 is critical (e.g., apply a routing change from time $T_1$ to $T_2$). Accordingly, a misbehaving algorithm of predictive routing engine 510 may start generating a large number of routing patches for very small durations, which may be quite detrimental to the stability of the network. Thus, ABM 502 monitoring the duration attributes of automated actions is of the utmost importance in addition to their number. Similarly, automation by predictive routing engine 510 may also start to malfunction for a given site simply because its behavior had not been anticipated by predictive routing engine 510 considering the dynamics of the site.

For each class of automation action (e.g., change of QoS shaping, change of path selection, etc.) ABM 502 may monitor a series of variables such as the number of actions, nature of the actions (e.g., duration for routing patches, etc.), or the like. In a simple embodiment, ABM 502 may use statistical models to detect outliers according to the nature of the networking parameters to which the action is being applied. In a second embodiment, ABM 502 may itself leverage a machine learning model to predict the expected number of actions by predictive routing engine 510 for a given site or router. For example, a regressor such as Gradient Boosted Trees may be used to regress the number of actions triggered for a given site according to its characteristics (e.g., type of applications, number of clients, traffic generated, etc.).

In instances in which predictive routing engine 510 is specific to a particular entity or network, ABM 502 may still be implemented as a global component interacting with each predictive routing engine, thus leveraging cross-network knowledge.

When ABM 502 detects abnormal automation activity (e.g., a high number of automation actions by predictive routing engine 510 for a given site, abnormal nature of action triggered like generation of routing patches for abnormally low duration, etc.), ABM 502 may raise an event of type Action-abnormal (site, nature, severity), that providing the nature of the anomaly (e.g., high number of action (QoS configuration changes) AND short-duration, etc.) and/or severity level.

In various embodiments, safety net engine process 248 may also include detrimental action detector 504, which detects and assesses any actions (e.g., routing changes) taken by predictive routing engine 510 that were detrimental to the network. In contrast with ABM 502 that monitors the output of predictive routing engine 510, detrimental action detector 504 monitors the consequence of an action on the network. To that end, detrimental action detector 504 may specify a list of Key Performance Indicators (KPI) of interest to either predictive routing engine 510 or directly from the network in question. Such KPI may be related to the network (layer 2, 3 or 4) such as, but not limited to, any or all of the following:

Number of packet drops per queue/per (w) RED profile (for a QoS configuration change actions)
Average waiting times per queue (for QoS configuration change actions)
Number of interface packet drops
Average load on a given path for a given applications (for path change action)
Number of minutes of SLA violations for a given application/site (for Path Change actions)
Distribution of the Quality of Experience (QoE) (such as the MoS) score for a given application/site (e.g., the distribution of the Good/Degraded/Bad MoS scores)

For KPIs obtained by detrimental action detector 504, detrimental action detector 504 may then leverage a statistical or machine learning-based model to detect undesirable consequence on the network. Note that the consequence of a given action by predictive routing engine 510 will always be reported to safety net engine process 248, whether positive or negative. Positive outcomes are reported so as to assess the overall efficacy of the system. Negative outcomes may be used by safety net engine process 248 to disable predictive routing engine 510 from making automatic changes to the network.

For each KPI of interest, safety net engine process 248 may send requests to the networking equipment (e.g., a router 110, etc.), so as to gather the relevant telemetry. In other cases, such as when the network comprises an SD-WAN, such telemetry may be retrieved by safety net engine process 248 interacting with the SDN controller and/or predictive routing engine 510. In the case of a traditional WAN (e.g., IWAN), safety net engine process 248 may gather the telemetry from the end device themselves. As would be appreciated, any KPI collection may be performed on-demand (e.g., when an automation action is triggered by predictive routing engine 510, such as a path change or a QoS configuration change), on a regular basis, or on a push basis. When telemetry is provided on-demand, the relevant telemetry must be gathered so as to train the model of detrimental action detector 504 for the related KPI in the absence of an automation action.

When detrimental action detector 504 detects a detrimental action, detrimental action detector 504 may generate an Action-detrimental (site-x, nature, severity) notification, indicating the detection of a potential detrimental action generated by predictive routing engine 510.

A further component of safety net engine process 248 may be safety net agent 506 that receives messages such as an Action-abnormal (site-x, nature, severity) message from ABM 502 or an Action-detrimental (site-x, nature, severity) message from detrimental action detector 504. In turn, safety net agent 506 may compare the received messages indicating the behavior of predictive routing engine 510 to one or more behavioral policies. Generally, these behavioral policies indicate the acceptable and unacceptable behaviors of predictive routing engine 510, as well as any corrective measures that should be taken, such as preventing predictive routing engine 510 from taking automatic actions in the network. In one embodiment, a network operator or other user may interact with safety net agent 506 via user interface(s) 512 to define these behavioral policies, explicitly. For example, the user may specify such policies:

If number of Action-Abnormal (*, path-change,severity>2)>X then DISABLE
If number of Action-Abnormal (*, qos-change,severity>1)>X AND Number of Action-detrimental (*, *, severity>1) then DISABLE In yet another embodiment, safety net agent 506 may assess the ratio between detrimental and beneficial events (e.g., number of saved minutes of voice failures/number of failed minutes of voice because of a detrimental automation action). One optional action by safety net agent 506 may be to start a configurable TIMER so as to avoid disabling predictive routing engine 510 due to a transient issue. If the condition is still met after the expiration of the TIMER, then the DISABLE actions is triggered.

Then a novel message DISABLE is sent to the Automation Agent requesting the engine to no longer generate any automation action. In yet another embodiment, the DISABLE message may request to stop the generation of actions for a given period of time for specific paths or sites.

In further embodiments, safety net engine process 248 may also include risk level controller 508 responsible for the configuration of a risk level that is used to automatically derive the set of policies related to both the severity assigned to Action-Abnormal and Action-Detrimental event. For example, some higher risk level may relate to networks where one may be keen to accept automation actions, even if their nature is abnormal, as long as the number of detrimental actions is not too high, and their severity is bounded (or even the ratio of beneficial/detrimental is higher than a specific threshold). In contrast, a conservative approach (low risk level) may request a low number of action-abnormal and action-detrimental with low severity.

Another potential function of risk level controller 508 may be to monitor the behavioral policies added/removed by the user of user interface(s) 512 to and/or from safety net engine process 248. It then is responsible for determining the risk-level preference of the user and recommend additional rules or configure risk-levels for automatic action. The user may choose to approve the risk-level before the system takes automatic action.

In one embodiment, risk level controller 508 may tag each behavioral policy rule into a binary choice of 'Preferred' or 'Not Preferred' by observing whether the user adds a specific rule and uses it in the future, or if the user removes the rule within, say, one week. Risk level controller 508 may then collect different features associated with such a rule. An example set of features may be <site, number of Action-detrimental events, mean severity of Action-detrimental, number of Action-Abnormal events, mean severity of Action-Abnormal>. It might also add path related parameters, for example, loss, and latency on existing path and predictive routing engine 510 recommended path. An interpretable classification model, such as a decision tree, can then be constructed to identify the features (or rules) that are highly likely for the user to use or discard. Based on this, risk level controller 508 may gather data across all sites/paths, and create a list of recommended behavioral policy rules for the user. Such rules may be showcased to user via user interface(s) 512, and can be triggered after explicit approval from the user.

In another embodiment, risk level controller 508 may use data and features across multiple users, network, or entities, rather than using the behavioral policy rules of the given user, to select the best predicted rules for a given user profile.

Figure 6:
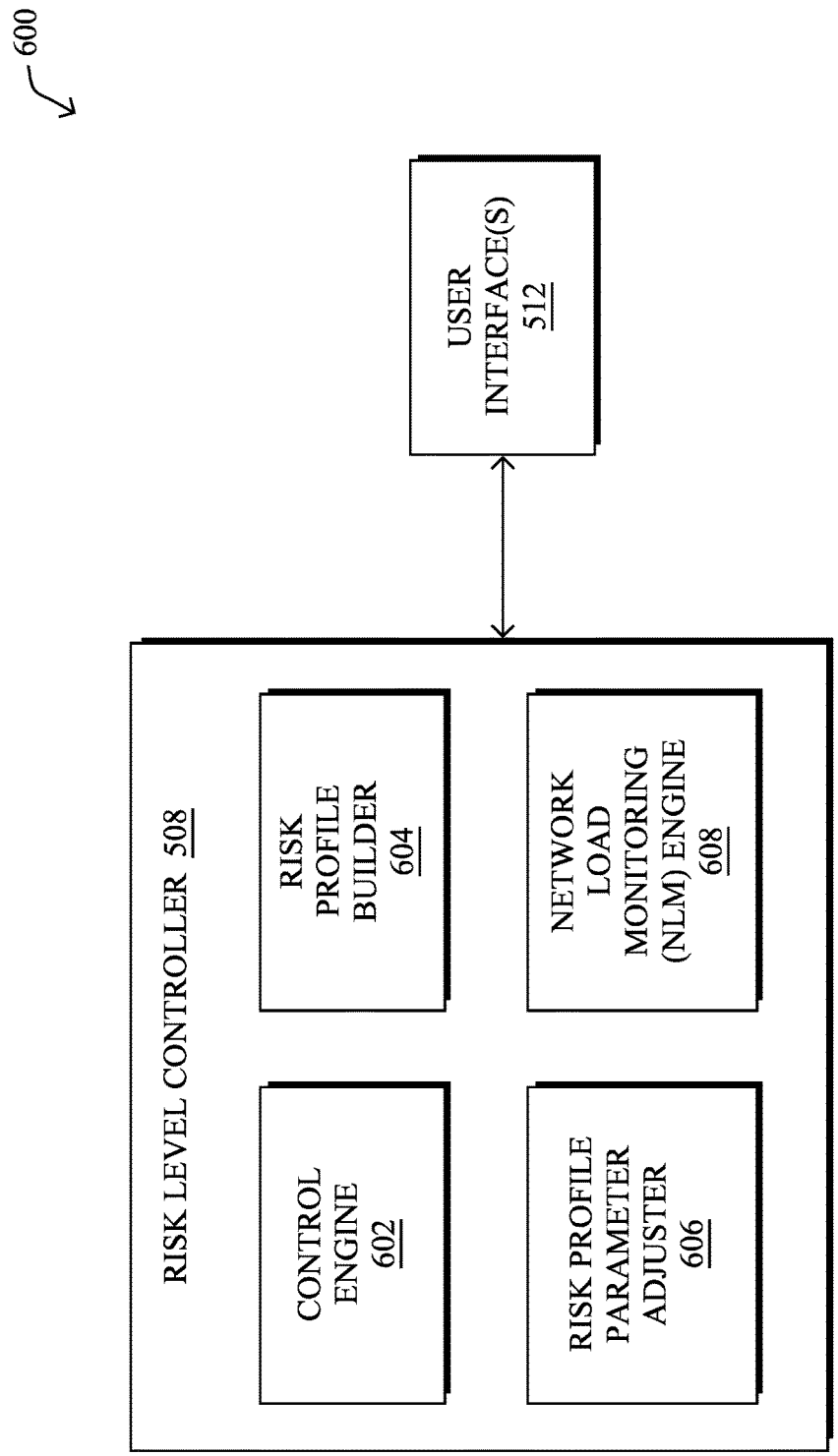
FIG. 6 illustrates an example architecture for a risk level controller.

FIG. 6 illustrates an example architecture for risk level controller 508, according to various embodiments. As shown, risk level controller 508 may include any or all of the following components: a control engine 602, a risk profile builder 604, risk profile parameter adjuster 606, and/or a network load monitoring (NLM) engine 608. Similar to the components of safety net engine process 248, these subcomponents In some embodiments, control engine 602 may assess two types of forecasts for every pair of source/alternate paths between two endpoints in a network:

Risk spread, which essentially measures the difference of the violation probabilities (i.e., risk) between the source path and a candidate alternate path. The larger this risk spread, the higher the likelihood that rerouting traffic from the source path to the alternate path leads to a saving.

Expected amount of traffic on the source path, which is often measured as a number of session-minutes. For instance, if the model expects five voice calls to be made on the primary for the next hour, this leads to 5×60=300 session-minutes.

Control engine 602 may assess these forecasts for a whole network and perform a constrained optimization by generating a set of re-routes that maximizes the expected savings while remaining within some actual or projected constraints, such as:

The maximal number of routers affected by a re-route in a given hour, day, etc.
The maximal number of re-routes performed by a given router, site, VPN, etc.
The maximal fraction of re-routes that lead to a degradation of the user experience.

Figure 7A:
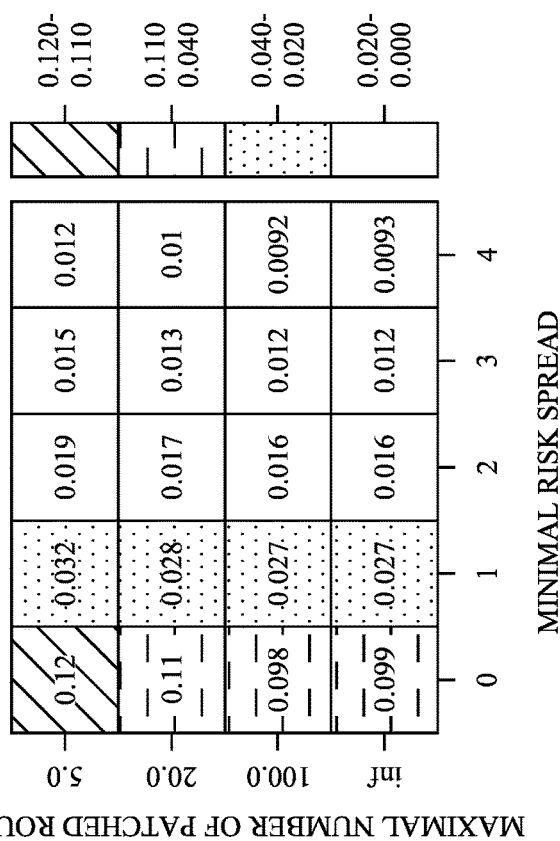
FIGS. 7A-7B illustrate example plots demonstrating a tradeoff when using predictive routing.
Figure 7B:
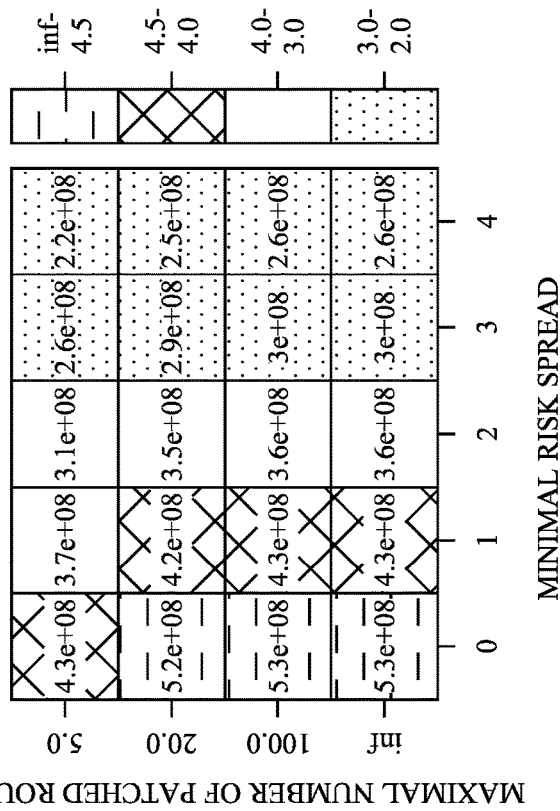

FIGS. 7A-7B illustrate plots demonstrating a tradeoff when using predictive routing, according to various embodiments. More specifically, plot 700 in FIG. 7A shows the savings achieved by a predictive routing engine over a three month period. Conversely, plot 710 in FIG. 7B illustrates the fraction of harmful reroutes performed by that engine in the same period of time. The largest savings are achieved by an unconstrained system that can make a large number of decisions (e.g., any router can be patched at any point in time) and not always good (e.g., up to 10% of the decisions can lead to a decrease in the quality of experience). Introducing constraints leads to lower savings, but this can be done in a predictable manner.

Referring again to FIG. 6, a "harmful" reroute corresponds to a reroute following a forecast that turns out to be detrimental (the original path was in fact "good," whereas the path chosen to reroute did violate the SLA). In the case of predictive routing systems, one needs to adjust the internal parameters of the system automatically to meet the requirements of the user.

In another embodiment, the risk may be defined as the uncertainty of savings while rerouting from a given source path to an alternate path. In this case, the historical savings between each pair of source/alternate path is monitored. The risk of the reroute may be defined in terms of the distribution of the savings achieved. For example, the risk can be defined as the probability with which the savings are greater than zero, which can be empirically measured from the distribution of savings. In other embodiments, risk can be computed based on other features such as time-of-the-day and day-of-the-week.

Another potential component of risk level controller 508 is risk profile builder 604, which automatically defines N regimes (where N is typically 3) corresponding to increasing tolerance to risk. To achieve this, risk level controller 508 relies on heuristics or unsupervised learning (e.g., clustering) to partition the design space of control engine 602 into N regions of relatively homogeneous performance and risk. For instance, the risk level controller 508 may build up a low-risk profile that will limit the projected fraction of harmful re-routes to 2% and the number of patched routers to only 5, a medium-risk profile that will allow up to 5% harmful re-routes and 10 patched routers, and a high-risk profile that will allow up to 10% harmful re-routes and 250 patched routers.

To generate such profiles, the risk level controller 508 can generate various configurations in the design space of control engine 602 and run control engine 602 with those parameters to simulate what the outcome would be with such parameters. If the design space of control engine 602 is large (e.g., if there are many parameters for control engine 602 and/or these parameters can take large sets or ranges of values), adaptive sampling techniques can be used to generate few configurations in the parts of the design space that do not affect results too much, and more configurations in other parts of the design space.

For each profile, risk level controller 508 estimates the projected savings per region, and the user can quickly see across the map how they would be scattered across the network for each profile, via user interface(s) 512. At the same time, the distribution of re-routes across routers, sites, VPNs, and/or paths can be shown for each profile. Based on this information, the user can make a decision with a simple click.

In another embodiment, the risk level controller 508 generates a survey for the user to complete via user interface(s) 512, which essentially consists of a sequence of questions regarding what outcome they would find acceptable or not. Examples of such questions are:

"If you could save 10,000 extra session-minutes in the coming week, would you agree to patch 5 more routers out of your 250 routers?"

"If you could drastically improve the experience of 250 users in the coming week, would you agree to marginally reduce the experience of 50 other users?"

Such questions can be regularly submitted to the user as a way to dynamically adjust the internal parameters of the system.

Risk profile parameter adjuster 606 allows the user to adjust the risk profile per site, country, VPN, as well as per time period. For instance, a retail user might want to be more aggressive during Black Friday than at other times. Such configuration can be either done via user interface(s) 512 or through configuration files. In another embodiment, risk profile parameter adjuster 606 may leverage an anomaly detection algorithm to detect deviations from baseline in terms of expected savings so as to suggest a switch to a higher, or lower, risk profile for some specific portions of the network or periods of time. For instance, a notification may be sent to the user asking whether they would be willing to upgrade to a higher risk profile to save an exceptional amount of traffic in the coming week for their sites in Japan.

A further potential component of risk level controller 508 is NLM engine 608, which monitors the CPU, memory, and storage of the various networking equipment in the network (e.g., routers, controller, etc.) and adjust the parameters of control engine 602 that influence such load metrics, accordingly. In particular, NLM engine 608 may gradually increase the number of re-routes allowed per router or the total number of re-configured routers per day while monitoring the load on the central controller (e.g., vManage for Viptela SD-WAN) and the network routers. If this load spikes abnormally or increases beyond what is considered normal, NLM engine 608 may signal risk profile parameter adjuster 606 to use less aggressive parameters.

Figure 8:
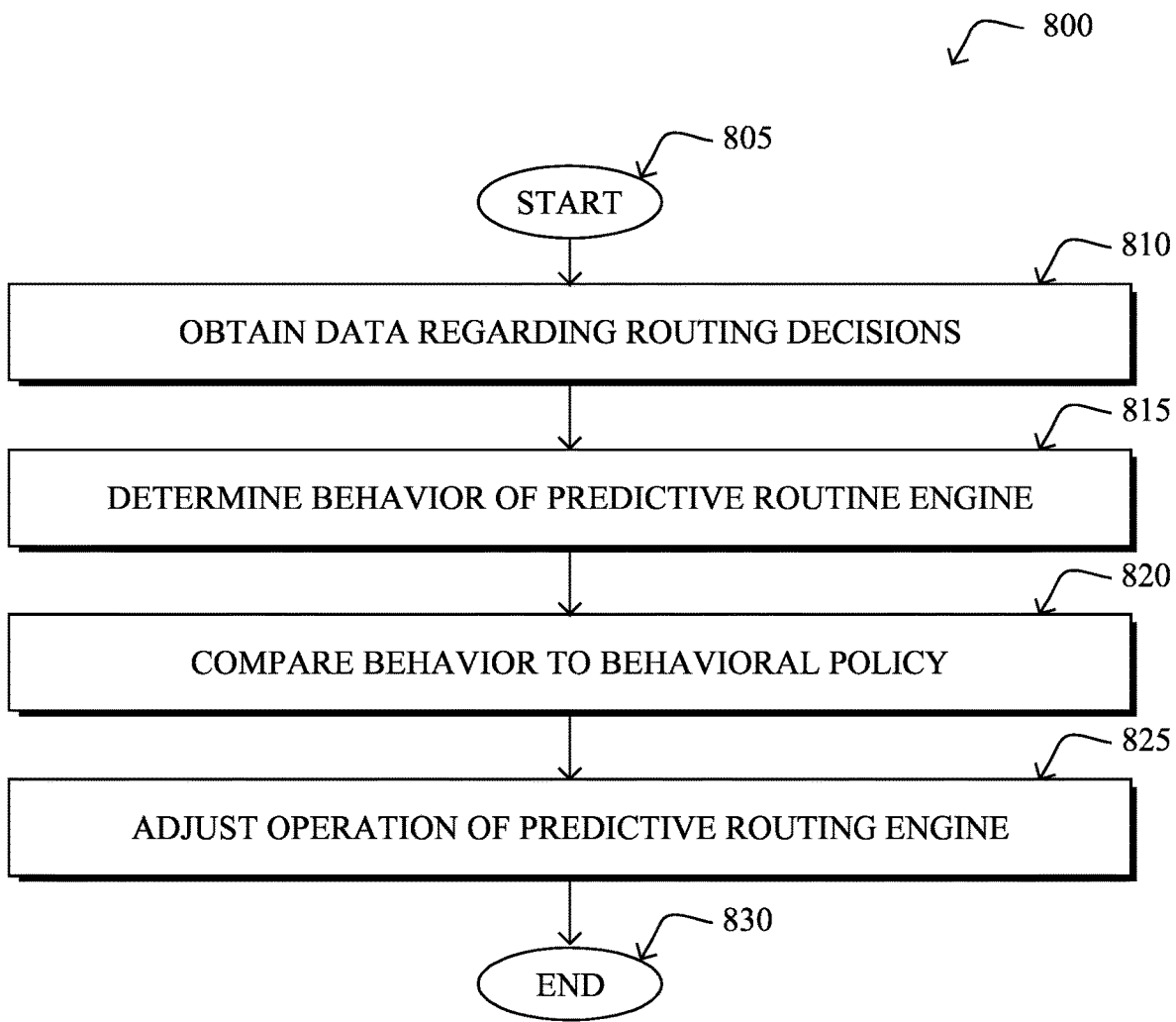
FIG. 8 illustrates an example simplified procedure for overseeing operation of a predictive routing engine.

FIG. 8 illustrates an example simplified procedure 800 for overseeing operation of a predictive routing engine, in accordance with one or more embodiments described herein. For example, a non-generic, specifically configured device (e.g., device 200), such as controller for a network (e.g., an SDN controller or other device in communication therewith, a networking device, etc.), may perform procedure 800 by executing stored instructions (e.g., routing process 244 and/or safety net engine process 248). The procedure 800 may start at step 805, and continues to step 810, where, as described in greater detail above, the device may obtain data regarding routing decisions made by a machine learning-based predictive routing engine for a network. In various embodiments, the data regarding the routing decisions includes measurements taken after a routing decision comprising one or more of: a number of packet drops, a queue waiting time, an application load for a path, an amount of time during which a service level agreement was violated, or quality of experience disruptions for an application.

At step 815, as detailed above, the device may determine, based on the data regarding the routing decisions, a behavior of the machine learning-based predictive routing engine. For instance, the behavior may correspond to the routing engine making routing decisions that were actually detrimental to the network (e.g., by needlessly rerouting traffic and/or failing to reroute traffic in advance of a failure). In another example, the behavior may correspond to the routing engine making anomalous routing decisions, such as an abnormal amount of reroutes in a certain time frame, an abnormal duration for its reroutes (e.g., short-lived reroutes that are quickly reverted back), or the like.

At step 820, the device may compare the behavior of the machine learning-based predictive routing engine to a behavioral policy for the machine learning-based predictive routing engine, as described in greater detail above. In various embodiments, the behavioral policy may be based in part on a user-specified risk tolerance, which may be specific to a particular location or time period. In further embodiments, the behavioral policy may be generated based further in part on a risk level of the routing engine making routing decisions that are anomalous or detrimental to the network. For instance, the device may present different scenarios to a network operator, to gauge their risk tolerance, and then attempt to select a behavioral policy that allows for a corresponding amount of risk.

At step 825, as detailed above, the device may adjust operation of the machine learning-based predictive routing engine, when the behavior of the machine learning-based predictive routing engine violates the behavioral policy. For instance, the device may prevent the machine learning-based predictive routing engine from making routing decisions for at least a portion of the network. Thus, the device may deactivate the automated routing functions of the predictive routing engine, if its behavior does not conform to the expectations of the network operator. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for oversight over automated, predictive routing mechanisms in a network. In some aspects, the techniques herein allow for the predictive routing mechanisms to be disabled, if the behavior of the mechanisms are outside the scope of what the network operator allows. In further aspects, the techniques herein also allow for different risk profiles to be used, so as to tailor the operation of the routing mechanisms to be more or less aggressive, as desired.

While there have been shown and described illustrative embodiments that provide for a safety net engine for machine learning-based network automation, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
    obtaining, by a device, data regarding routing decisions made by a machine learning-based predictive routing engine for a software-defined network (SDN), wherein the data regarding the routing decisions includes measurements taken after a given routing decision is implemented in the SDN;
    determining, by the device and based on the data regarding the routing decisions, a behavior of the machine learning-based predictive routing engine;
    determining, by the device and based on feedback obtained at a user interface, a user-specified risk tolerance for the machine learning-based predictive routing engine, wherein a behavioral policy is generated based in part on the user-specified risk tolerance and defines abnormal behavior of the machine learning-based predictive routing engine;
    comparing, by the device, the behavior of the machine learning-based predictive routing engine to the behavioral policy to determine that the behavior of the machine learning-based predictive routing engine is abnormal when the behavior of the machine learning-based predictive routing engine is a statistical outlier compared to an expected behavior of the machine learning-based predictive routing engine; and
    adjusting, by the device, operation of the machine learning-based predictive routing engine, when the behavior of the machine learning-based predictive routing engine is abnormal.

2. The method as in claim 1, wherein the measurements comprise one or more of: a number of packet drops, a queue waiting time, an application load for a path, an amount of time during which a service level agreement was violated, or quality of experience disruptions for an application.

3. The method as in claim 1, wherein abnormal behavior is defined according to various thresholds, including: a threshold indicative of an abnormal number of reroutes made by the machine learning-based predictive routing engine, a threshold indicative of an abnormal duration for reroutes made by the machine learning-based predictive routing engine, or a threshold indicative of a severity level for reroutes made by the machine learning-based predictive routing engine.

4. The method as in claim 1, wherein the behavioral policy specifies an unacceptable amount of detrimental routing decisions made by the machine learning-based predictive routing engine, wherein an unacceptable amount is being above a threshold and a detrimental routing decision is identified based on a network-related key performance indicator being a statistical outlier identified by a statistical or machine learning mode compared to an expected measurement for the network-related key performance indicator.

5. The method as in claim 1, wherein adjusting operation of the machine learning-based predictive routing engine, when the behavior of the machine learning-based predictive routing engine violates the behavioral policy, comprises:
    preventing the machine learning-based predictive routing engine from making routing decisions for at least a portion of the SDN.

6. The method as in claim 1, further comprising:
    generating the behavioral policy based in part on a risk level of the machine learning-based predictive routing engine making routing decisions that are anomalous or detrimental to the SDN, wherein a routing decision is identified as anomalous or detrimental based on a network-related key performance indicator being a statistical outlier identified by a statistical or machine learning mode compared to an expected measurement for the network-related key performance indicator.

7. The method as in claim 1, wherein the user-specified risk tolerance is for a particular location in the SDN or a particular time period.

8. The method as in claim 1, further comprising:
adjusting the behavioral policy based in part on a survey sent to a user interface querying a network operator for their opinions regarding potential outcomes of the routing decisions made by a machine learning-based predictive routing engine for a network.

9. An apparatus, comprising:
one or more network interfaces;
a processor coupled to the one or more network interfaces and configured to execute one or more processes; and
a memory configured to store a process that is executable by the processor, the process when executed configured to:
obtain data regarding routing decisions made by a machine learning-based predictive routing engine for a software-defined network (SDN), wherein the data regarding the routing decisions includes measurements taken after a given routing decision is implemented in the SDN;
determine, based on the data regarding the routing decisions, a behavior of the machine learning-based predictive routing engine that defines abnormal behavior of the machine learning-based predictive routing engine;
determine, based on feedback obtained at a user interface, a user-specified risk tolerance for the machine learning-based predictive routing engine, wherein a behavioral policy is generated based in part on the user-specified risk tolerance and defines abnormal behavior of the machine learning-based predictive routing engine;
compare the behavior of the machine learning-based predictive routing engine to the behavioral policy to determine that the behavior of the machine learning-based predictive routing engine is abnormal when the behavior of the machine learning-based predictive routing engine is a statistical outlier compared to an expected behavior of the machine learning-based predictive routing engine; and
adjust operation of the machine learning-based predictive routing engine, when the behavior of the machine learning-based predictive routing engine is abnormal.

10. The apparatus as in claim 9, wherein the measurements comprise one or more of: a number of packet drops, a queue waiting time, an application load for a path, an amount of time during which a service level agreement was violated, or quality of experience disruptions for an application.

11. The apparatus as in claim 9, wherein abnormal behavior is defined according to various thresholds, including: a threshold indicative of an abnormal number of reroutes made by the machine learning-based predictive routing engine, a threshold indicative of an abnormal duration for reroutes made by the machine learning-based predictive routing engine, or a threshold indicative of a severity level for reroutes made by the machine learning-based predictive routing engine.

12. The apparatus as in claim 9, wherein the behavioral policy specifies an unacceptable amount of detrimental routing decisions made by the machine learning-based predictive routing engine, wherein an unacceptable amount is being above a threshold and a detrimental routing decision is identified based on a network-related key performance indicator being a statistical outlier identified by a statistical or machine learning mode compared to an expected measurement for the network-related key performance indicator.

13. The apparatus as in claim 9, wherein the apparatus adjusts operation of the machine learning-based predictive routing engine, when the behavior of the machine learning-based predictive routing engine violates the behavioral policy, by:
preventing the machine learning-based predictive routing engine from making routing decisions for at least a portion of the SDN.

14. The apparatus as in claim 9, wherein the process when executed is further configured to:
generate the behavioral policy based in part on a risk level of the machine learning-based predictive routing engine making routing decisions that are anomalous or detrimental to the SDN, wherein a routing decision is identified as anomalous or detrimental based on a network-related key performance indicator being a statistical outlier identified by a statistical or machine learning mode compared to an expected measurement for the network-related key performance indicator.

15. The apparatus as in claim 9, wherein the user-specified risk tolerance is for a particular location in the SDN or a particular time period.

16. The apparatus as in claim 9, wherein the process when executed is further configured to:
adjust the behavioral policy based in part on a survey sent to a user interface querying a network operator for their opinions regarding potential outcomes of the routing decisions made by a machine learning-based predictive routing engine for a network.

17. A tangible, non-transitory, computer-readable medium storing program instructions that cause a device to execute a process comprising:
obtaining, by a device, data regarding routing decisions made by a machine learning-based predictive routing engine for a software-defined network (SDN), wherein the data regarding the routing decisions includes measurements taken after a given routing decision is implemented in the SDN;
determining, by the device and based on the data regarding the routing decisions, a behavior of the machine learning-based predictive routing engine that defines abnormal behavior of the machine learning-based predictive routing engine;
determining, by the device and based on feedback obtained at a user interface, a user-specified risk tolerance for the machine learning-based predictive routing engine, wherein a behavioral policy is generated based in part on the user-specified risk tolerance and defines abnormal behavior of the machine learning-based predictive routing engine;
comparing, by the device, the behavior of the machine learning-based predictive routing engine to the behavioral policy to determine that the behavior of the machine learning-based predictive routing engine is abnormal when the behavior of the machine learning-based predictive routing engine is a statistical outlier compared to an expected behavior of the machine learning-based predictive routing engine; and adjusting, by the device, operation of the machine learning-based predictive routing engine, when the behavior of the machine learning-based predictive routing engine is abnormal.

* * * * *